(12) United States Patent
Hsieh et al.

(10) Patent No.: US 7,904,890 B1
(45) Date of Patent: Mar. 8, 2011

(54) SOFTWARE TEST COVERAGE METRICS

(75) Inventors: Teh-Ming Hsieh, San Jose, CA (US); Bing Y. Lin, Cupertino, CA (US); Mark L. Blend, Santa Clara, CA (US)

(73) Assignee: Oracle America, Inc., Redwood City, CA (US)

(*) Notice: Subject to any disclaimer, the term of this patent is extended or adjusted under 35 U.S.C. 154(b) by 1205 days.

(21) Appl. No.: 11/523,952

(22) Filed: Sep. 19, 2006

(51) Int. Cl.
*G06F 9/44* (2006.01)

(52) U.S. Cl. .......................... 717/131; 717/124

(58) Field of Classification Search .................. None
See application file for complete search history.

(56) References Cited

U.S. PATENT DOCUMENTS

| | | | |
|---|---|---|---|
| 6,742,178 B1* | 5/2004 | Berry et al. ............ | 717/130 |
| 2003/0140036 A1* | 7/2003 | Belowsov ............ | 707/3 |
| 2004/0078780 A1* | 4/2004 | Dutt et al. ............ | 717/106 |
| 2004/0078785 A1* | 4/2004 | Dutt et al. ............ | 717/136 |
| 2004/0154001 A1* | 8/2004 | Haghighat et al. ...... | 717/130 |
| 2005/0081106 A1* | 4/2005 | Chang et al. ............ | 714/38 |

* cited by examiner

*Primary Examiner* — Michael J Yigdall
*Assistant Examiner* — Ben C Wang
(74) *Attorney, Agent, or Firm* — Osha • Liang LLP

(57) ABSTRACT

A mechanism is disclosed for determining how thoroughly a set of code has been tested. The mechanism involves identifying which portions within the set of code are interface portions and which portions are internal portions. A test is executed to test the set of code. Based upon a set of testing information derived from the test, an interface test metric is derived that provides a measure of how thoroughly the interface portions were tested by the test. Based upon the set of testing information, an internal test metric is derived that provides a measure of how thoroughly the internal portions were tested by the test. In one embodiment, an overall measure of how thoroughly the set of code has been tested by the test is derived, based upon the interface test metric and the internal test metric.

18 Claims, 4 Drawing Sheets

SOFTWARE TEST COVERAGE METRICS

BACKGROUND

Computer source code is typically written using a high level computer language. Examples of high level languages include C, C++, the Java™ programming language, etc. Once written, source code is converted into object or machine code, which can be executed by a computer. A computer program called a compiler program receives as input source code and generates as output object code which may be loaded into the computer memory and executed.

Often, the source code will contain "bugs". Bugs are errors in the original source code that cause unexpected results during the execution of the object code. These unexpected results may cause the computer executing the object code to generate unintended output and erroneous data, or to terminate prematurely.

Before releasing any set of computer code, software manufacturers test their code rigorously. Ideally, every set of code should be 100% tested prior to release so that once released, the computer code will not experience any errors. From a practical standpoint, however, this is extremely difficult if not impossible. To do so would require more resources (both in terms of human resources and actual costs) than would be practicable to expend.

One of the most difficult aspects of testing software is to determine when a set of code has been sufficiently tested. To determine whether a set of code has been sufficiently tested, manufacturers generally run tests on the code, and generate test coverage data based upon the tests. Basically, the coverage data specifies which lines of source code were executed during the tests, and what percentage of the lines of source code (LOC) were actually executed and tested. Based upon the coverage data, the manufacturer determines whether the set of code has been sufficiently tested.

However, merely determining that a certain percentage of LOC executed during testing does not reveal the actual quality of testing. For example, it may be that the LOC that did not execute during testing were not that critical. However, even if the percentage of LOCs that executed is high, some very important LOCs may still have been missed. Moreover, the executed percentage does not reveal what further tests should be developed to cover the remaining LOCs.

It is possible to perform a detailed analysis of the LOCs that executed during testing to determine if the test coverage is adequate and/or what additional tests should be performed. However, frequently the test engineers who conduct the testing do not have sufficient understanding of the code to perform such analysis. The software engineer(s) who wrote the software under test are better able to analyze the test results. However, this analysis takes considerable time and often the software engineers do not have the time to analyze the test results.

Thus, it is difficult to properly analyze test results, such as which LOCs executed. As a consequence, resources are frequently wasted because of the difficulty in determining how to design further tests after an initial test run. Moreover, resources are sometimes wasted in testing code, or at least portions thereof, which do not require further testing. As software becomes increasingly complex these problems become more difficult.

Because of these and potentially other drawbacks, this approach does not provide wholly satisfactory results. Consequently, an improved method and system for testing computer software is desired.

SUMMARY

In accordance with one embodiment of the present invention, there is provided a method of determining how thoroughly a set of software source code has been tested. More particularly, an embodiment of the present invention comprises the following. The method involves identifying which portion or portions within the set of code are interface portions and which portion or portions are internal portions. The interface portions are portions that may be invoked by external software, and the internal portions are portions that may be invoked by the interface portions but do not interface with the external software. A test is executed to test the set of code. Based upon a set of testing information derived from the test, an interface test metric is derived that provides a measure of how thoroughly the interface portions were tested by the test. Based upon the set of testing information, an internal test metric is also derived that provides a measure of how thoroughly the internal portions were tested by the test. In one embodiment, an overall measure of how thoroughly the set of code has been tested by the test is derived, based upon the interface test metric and the internal test metric. The various test metrics can be derived for the entire set of code or for any section of the code. Thus, the focus can be placed on any particular section of the code, which allows a finer grained analysis of a particular section.

Identifying interface portions and internal portions within the set of code can be performed in a number of ways. The technique may depend on what section of the code is being focused on. For example, the focus can have any level of granularity from the entire set of code to a single function. In one embodiment, global functions are identified as interface portions and local functions as internal portions. In one embodiment, functions listed in an include file, header file, or class library (which may list shareable functions, for example), are identified as interface portions.

If the focus is on a particular section of the code, then identifying interface portions and internal portions within the particular section may comprise analyzing a hierarchical structure that defines, for each particular function, the functions that may invoke the particular function and the functions that the particular function may invoke.

For an atomic view of a simple function, if the focus is on a particular function, then identifying interface portions and internal portions may comprise identifying an entrance point of the particular function as being an interface portion and identifying an exit point of the particular function is being as an internal portion.

Notice that the various test metrics can be used to better understand test coverage data, such as percentage of LOCs executed during test. Moreover, the test metrics allows the test results to be analyzed without detailed and time consuming analysis by the software engineers who wrote the code under test. Additionally, the test metrics allow a testing team or others without significant understanding of the code itself to easily evaluate the effectiveness of the current test and to adjust resources and/or test approaches accordingly.

DETAILED DESCRIPTION OF EMBODIMENT(S)

Functional Overview of Generating Test Metrics

Figure 1:
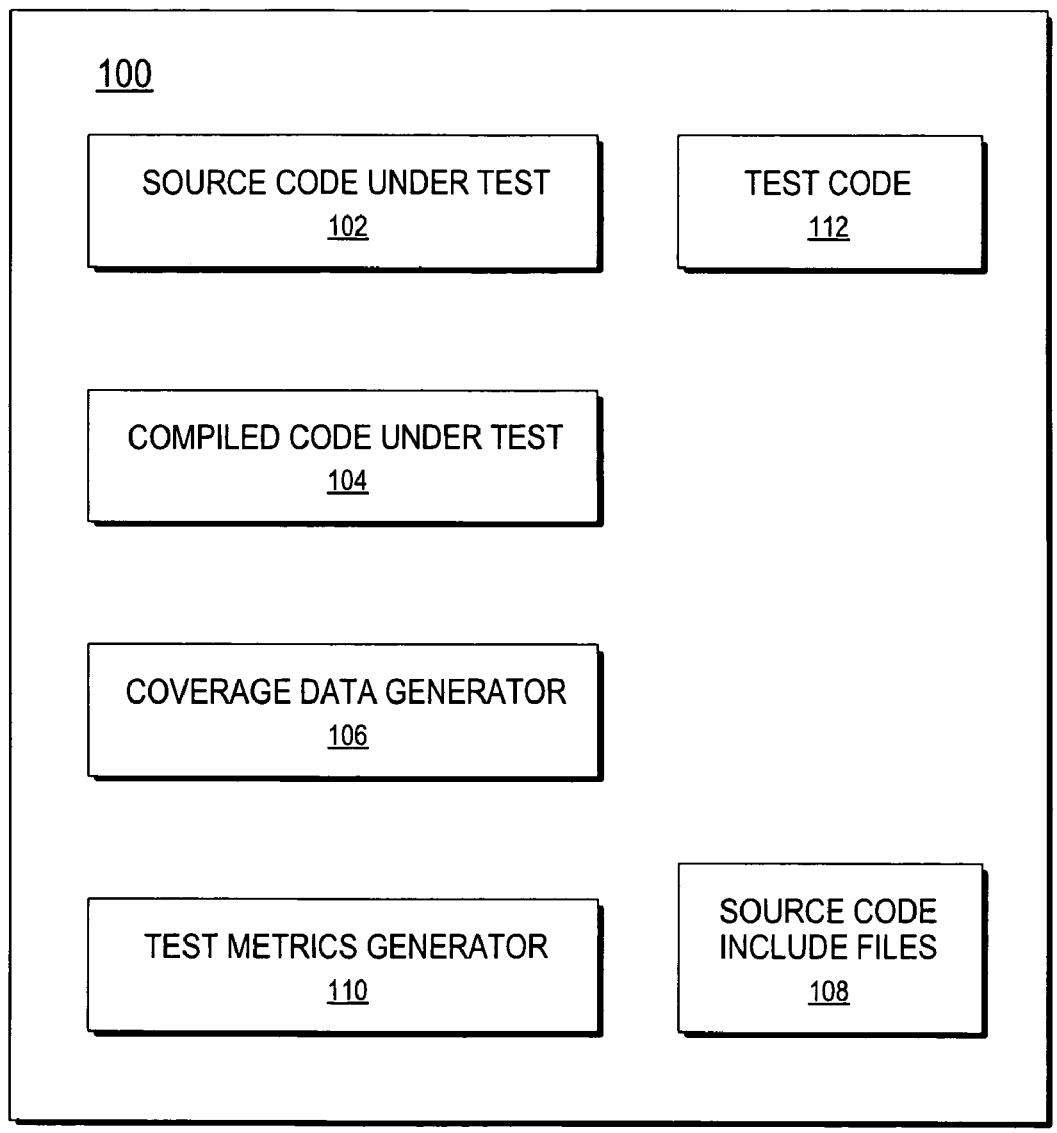
FIG. 1 is a system for determining how thoroughly a set of code has been tested, in accordance with an embodiment of the present invention.

With reference to FIG. 1, there is shown a functional block diagram of a sample system 100 in which one embodiment of the present invention may be implemented. As shown in FIG. 1, the sample system 100 comprises a set of source code under test 102, test code 112, compiled code under test 104, source code include files 108, a coverage data generator 108, and code metric generator 110. The source code under test 102 is compiled to derive the set of compiled code under test 104. It is the compiled code under test 104 that is actually executed during testing. The test code 112 contains instructions that cause the source code 102 to execute in order to test the source code 102. After the source code 102 is compiled to derive the compiled code 104, the compiled code 104 is executed to implement the logic of the source code 102.

After the code execution is complete, the coverage data generator 106 uses information obtained during the execution to determine which lines of source code 102 were executed and which lines were not executed. The coverage data generator 106 outputs a set of testing information, which describes the test coverage. However, the number of lines tested or percentage of lines tested does not, in itself, provide a clear indication of how thoroughly the code was tested and what other tests should be run to further test the code.

Therefore, the test metric generator 110 generates test metrics to facilitate understanding the test information. The test metrics may include a test metric for interface portions of the source code 102, a test metric for internal portions of the source code 102, and an overall test metric based on the internal test metric and the interface test metric. These test metrics provide an understanding of how thorough the test was and can be used to interpret coverage data, such as percentage of source code lines tested.

In order to generate the test metrics, the test metric generator 110 identifies which portions of the source code 102 are interface portions and which portions are internal portions. As examples, interface portions are functions that may be invoked from software external to the source code 102, and the internal portions are functions that may be invoked by the interface functions. However, which portions of the source code 102 constitute interface portions and internal portions is dependent on what section of the code is being focused on. For example, test metrics can be determined for the entire source code 102 or for a section of the source code 102.

A particular portion of the code 102 could be considered to be an interface portion or an internal portion, depending on what the section of the code 102 is being focused on. As a more particular example, the initial focus could be on the entire source code 102. After analyzing the test metrics, the focus can be shifted to a particular section of the source code 102. For example, the source code 102 might have multiple software layers with each layer having an interface to the layer above it and the layer below it. However, only the uppermost layer has an interface to software external to the source code 102. The initial focus might be on entire body of code, in which case the interface portion is only the interface to the external software in the uppermost layer. Next, the focus might shift to a particular software layer within the source code 102, in which case the interface portion is now interface(s) in that particular software layer.

In one embodiment, the test metrics generator 110 identifies the interface portions and internal portions based on tags (e.g., global, local) in object files associated with the source code 102. In one embodiment, the test metrics generator 110 inputs the source code include files 108 to identify which portions of the source code 102 are interface portions and which portions are internal portions. The include files 108 list functions in the sourced code 102 that are shareable with software that is external to the source code 102.

In another embodiment, the test metric generator 110 identifies the interface portions and internal portions based on, for each particular function, which functions can invoke the particular function and which functions the particular function can invoke. An example hierarchical data structure that can be used in this identification is depicted in FIG. 2.

Test metrics are determined for a single function, in accordance with one embodiment of the present invention. Thus, a single function is automatically divided into one or more interface portions and one or more internal portions, in accordance with an embodiment. In this embodiment, an interface portion could comprise an entrance point to the function. The internal portions could comprise exit points, local functions, logical statements or private classes of the function, in this embodiment. However, the division between interface portions and internal portions could be along other lines.

Example Hierarchical Code Structure

Figure 2:
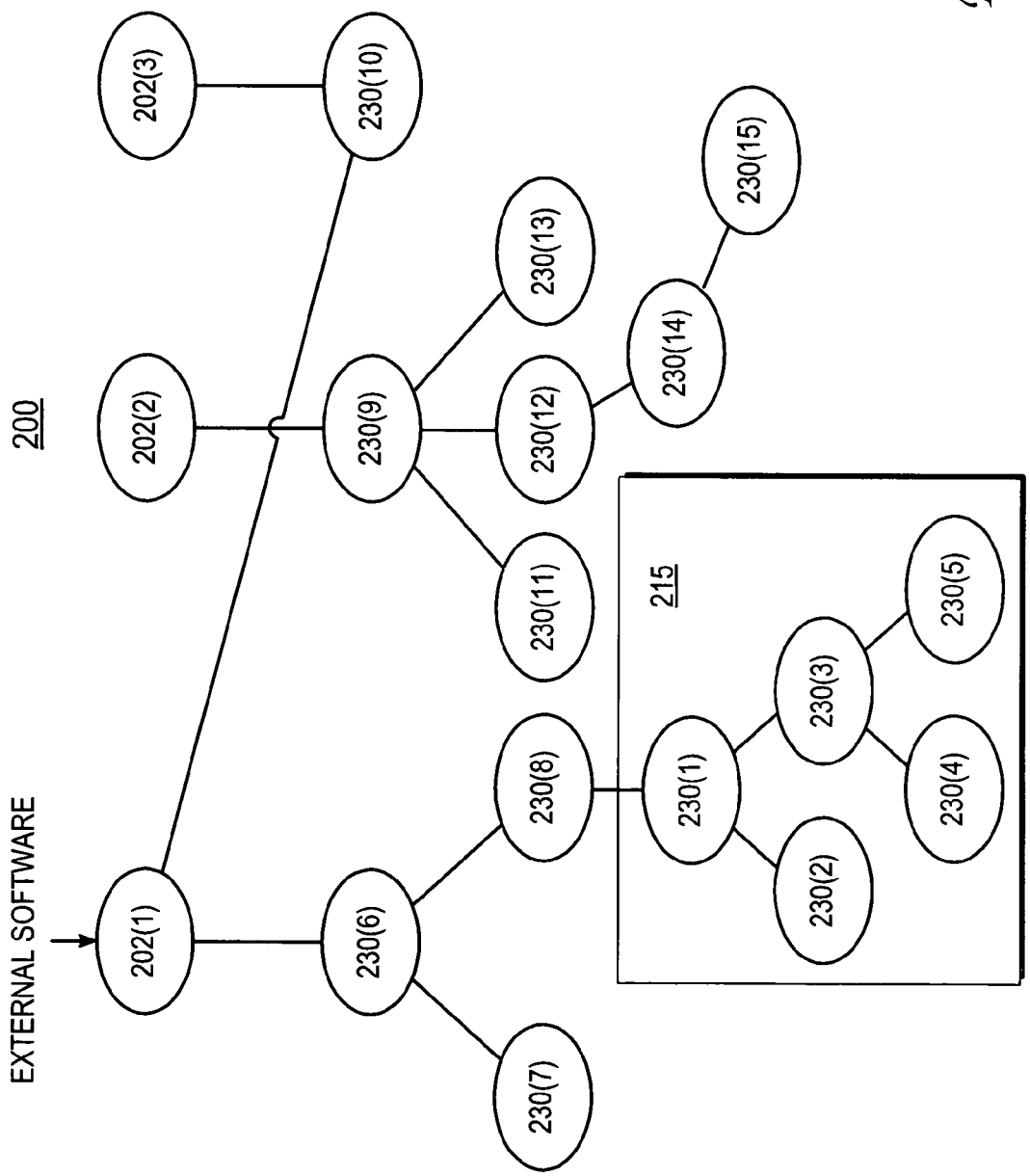
FIG. 2 is an example of a hierarchical structure of a set of code that is used to illustrate identifying interface and internal portions of the code, in accordance with an embodiment of the present invention.

With reference to FIG. 2, there is shown an example hierarchical structure 200 for a set of code for which test metrics are determined, in accordance with an embodiment of the present invention. The hierarchical structure 200 is based on which functions can invoke a particular function and which functions the particular function can invoke. The hierarchical structure 200 can be automatically generated by analyzing a file that describes what functions can be invoked by each particular function. The example hierarchical structure 200 is greatly simplified from a typical set of code that would be tested.

The hierarchical structure 200 has several functions 202(1), 202(2), 202(3) that interface to external software. The external software is not permitted to directly invoke interface functions other than functions 202(1)-202(3). However, depending on what section of the hierarchical structure 200 is being focused on, these other functions might be identified as either interface portions or internal portions, as will be discussed below.

As previously discussed, test metrics can be determined by focusing on the entire set of code. If the focus is on the entire set of code depicted by the hierarchical structure 200, functions 202(1)-202(3) are interface portions and the rest of the functions 230(1)-230(15), which are not permitted to be invoked by the external software, are internal portions. Rather, the rest of the functions 230(1)-230(15) may be invoked by either the interface functions 202(1)-202(3) of another internal function.

Rather than focusing on the entire code, test metrics are determined for a section of the code, in accordance with one embodiment. As an example, the focus might be on code block 215. In this example, function 230(1) is an interface portion, as it may be invoked by software that is external to code block 215. Functions 230(2), 230(3), 230(4), and 230(5)

are internal portions, as those functions are not permitted to be invoked by software external to the code block 215.

Focusing on a section of code allows drilling down to lower layers of the hierarchy. For example, if a particular branch of the hierarchical structure 200 had poor internal coverage, then the focus can be shifted to that branch.

Process Flow in Accordance with an Embodiment

Figure 3:
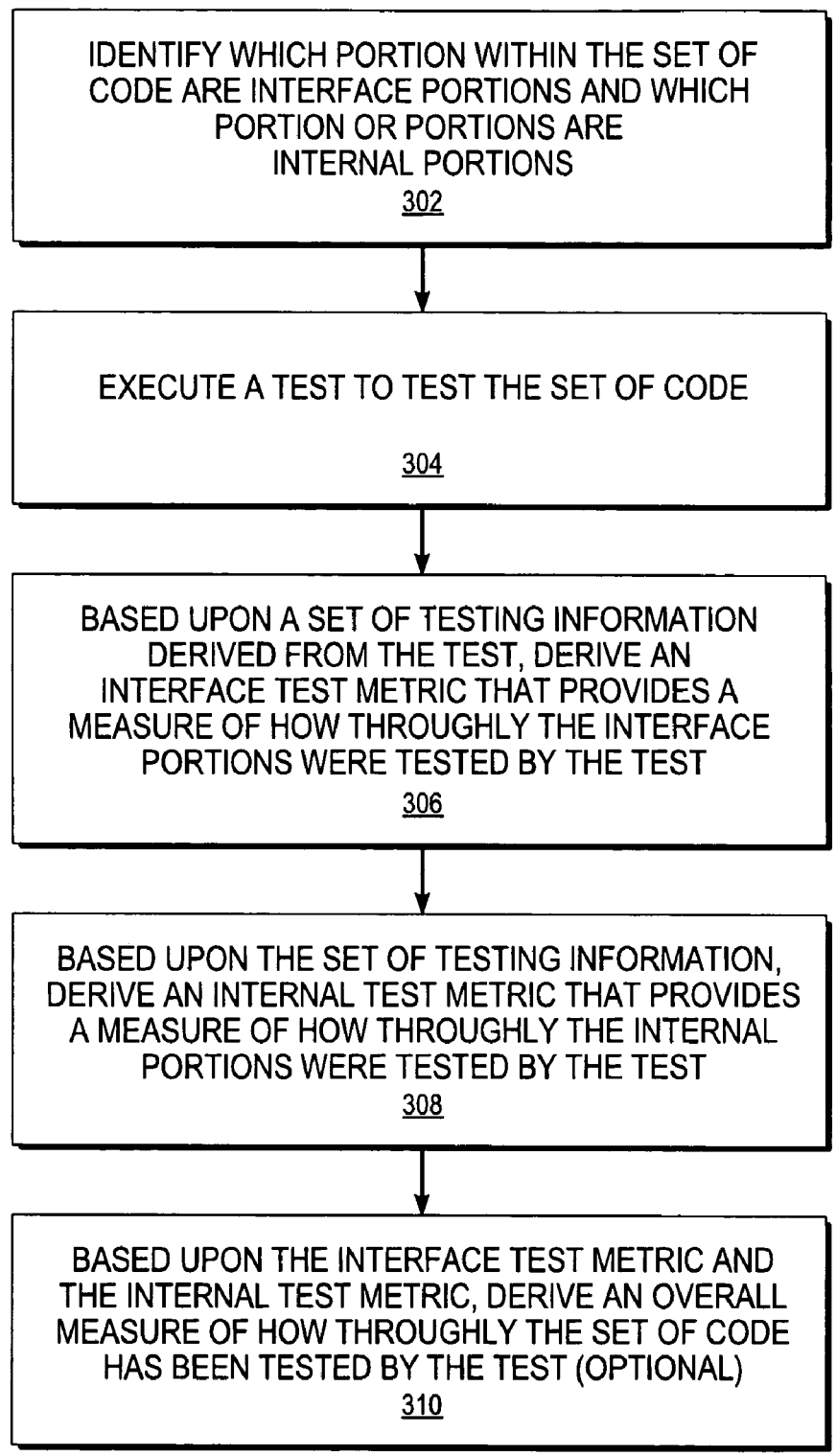
FIG. 3 is a flowchart illustrating steps of a process of determining how thoroughly a set of code has been tested, in accordance with an embodiment of the present invention.

FIG. 3 is a flowchart illustrating steps of a process 300 of determining how thoroughly a set of code has been tested, in accordance with an embodiment of the present invention. In step 302, a portion or portions of the code are identified as interface portions and a portion or portions of the code are identified as internal portions.

This identification can be performed in a variety of ways and can be based on where the boundary of the code is selected to be. For example, an object file associated with each particular function might have a tag or other indicator that defines that function as being a global function or a local function. In one embodiment, step 302 comprises identifying the global functions as interface portions and the local functions as internal portions. However, it is not required that a global function be identified as an interface portion or that a local function be identified as an internal portion, as the following discussion explains.

As another example, the identification can be based on information in an include file. For example, the include file identifies functions that may be shared with software external to the set of code. Thus, functions that are listed in an include file are identified in step 302 as "interface portions", in one embodiment.

As still another example, if the focus is on a particular function, then an entrance point of the particular function is identified as being an interface portion and non-interface portions of the particular function is identified as an internal portion. A particular function may have multiple entrance points, and therefore have multiple interface points.

Still another example of identifying interface and internal portions is based on an analysis of a hierarchical structure 200. FIG. 2 illustrates an example of a hierarchical structure 200. To identify the interface portions and internal portions, a code block is identified. For example, code block 215 is identified. The interface portions are those functions that can be invoked from outside of the code block 215. The internal portions are those functions that cannot be invoked from outside of the code block 215.

In step 304, a test is executed to test the set of code and to generate a set of testing information. For example, after the code is tested, the tester can use a code coverage analyzer to generate the code coverage percentage for interface portion and internal portion.

In step 306, an interface test metric that provides a measure of how thoroughly the interface portions were tested is generated, based on the set of testing information. The interface test metric is based on how many interface functions were invoked, in one embodiment. For example, referring to the example of FIG. 2 in which functions 202(1)-202(3) are identified as the interface portions, if functions 202(1) and 202(2) were invoked, but not function 202(3), then the interface test metric could be assigned a value of ⅔.

The interface test metric is based on entrance points to a function, in one embodiment. For example, as previously discussed, the interface portions might be entrance points to a function. In this case, the interface test metrics can be based on the number or percentage of entrance points taken during the test. These entrance points might be to a single function.

However, the interface test metric might also be based on test information pertaining to all of the entrance points of multiple functions. In this case, the interface test metric can be derived from any statistical analysis of the entrance points taken during the test, such as the average percentage of entrance points taken per function, total percentage of entrance points taken for all functions combined, etc.

In step 308, an internal test metric that provides a measure of how thoroughly the internal portions were tested is generated, based on the set of testing information. The internal test metric is based on how many internal functions were invoked, in one embodiment. In another embodiment, the internal test metric is based on lines of source code that executed during the test, provided the lines of source code are associated with an internal portion of interest. For example, if the focus is on block 215 of FIG. 2, then lines of code in functions 230(2)-230(5) may be of interest.

Any statistical measure of the lines of source code executed can be used to derive the internal test metric. For example, the internal test metric can be based on the average of the percentage of lines of source code executed for each function. Alternatively, the internal test metric can be based on the percentage of lines of source code executed for all of the functions.

The internal test metric is based on the number of a function's local functions or logical statements taken, in one embodiment. Typically, if the internal test metric is based on a measure that corresponds to a similar measure used for the interface test metric, although this is not an absolute requirement. For example, when basing the interface test metric on a function's entrance points that were taken, the internal test metric is typically based on the remaining lines of code.

In step 310, an overall measure of how thoroughly the set of code has been tested is derived, based upon the interface test metric and the internal test metric. The overall measure is based on a comparison of the internal test metric and the interface test metric, in one embodiment. Any type of comparison can be used. The comparison is based on a ratio of the interface test metric to the internal test metric, in one embodiment. For example, the overall measure is based on the percentage of interface portions that were invoked during the test divided by the percentage of internal functions that were invoked, in accordance with one embodiment.

The interface test metric, the internal test metric, and the overall measure may be stored in a computer readable medium and also may be output to a user via any user interface of a computer system.

Example Interpretation of Overall Test Metric

The overall measure is based on a ratio of the interface test metric to the internal test metric, in one embodiment. This measure will be referred to as "TQI", which stands for total quality index. If the TQI is substantially greater than one, it may mean that the test process is a shallow one. That, is many local portions were not tested despite a relatively complete coverage of interface portions. In this case, the percentage of lines covered may not be a good measure of the test quality. However, if the goal of the test is to test a particular interface, then a high TQI may indicate a high quality test process.

A TQI that is approximately equal to one may mean that the test process was done relatively evenly between interface portions and internal portions. Thus, a measure such as percentage of lines of source code covered may reflect the true quality of the test process.

A TQI of substantially less than one may mean that internal portions were covered well, but that interface portions were not. This may indicate that the testing process was of high quality in the local functions, or private classes.

The TQI may be interpreted in other ways. Moreover, the TQI can be interpreted differently based on what section of the code is being focused on.

Hardware Overview

Figure 4:
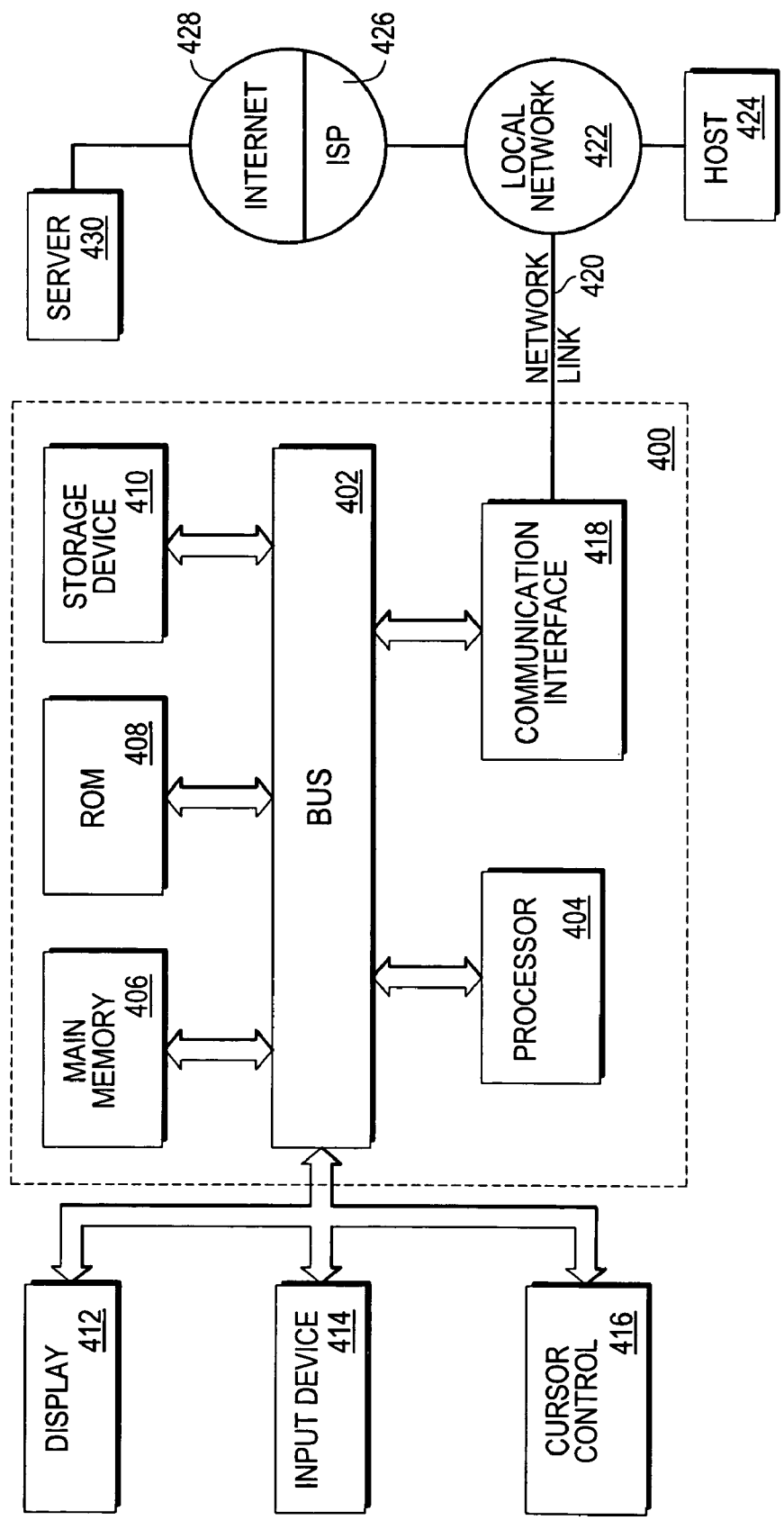
FIG. 4 is a diagram illustrating a computer system upon which an embodiment of the present invention may be practiced.

In one embodiment, the various components 102, 104, 106, 110 and 112 in FIG. 2 are implemented as sets of instructions executable by one or more processors. In one embodiment, steps of process 300 may take the form of sets of instructions that are executed by one or more processors. If they take the form of sets of instructions, FIG. 4 shows a block diagram of a computer system 400 upon which these sets of instructions may be executed. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412 for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may further be a network connection that connects one or more of the components. Any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 405.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method for determining how thoroughly a set of code has been tested, wherein the set of code comprises a plurality of interface portions and a plurality of internal portions, wherein the plurality of interface portions are portions that may be accessed by external software and the plurality of internal portions are portions that may be accessed by at least one of the plurality of interface portions and other of the plurality of internal portions, the method comprising:

identifying which portion or portions within the set of code are the plurality of interface portions and which portion or portions are the plurality of internal portions;

executing a test to test the set of code to obtain a set of testing information derived from the test, wherein the set of testing information identifies a plurality of tested interface portions and a plurality of tested internal portions, wherein the plurality of tested interface portions and the plurality of tested internal portions are tested during the test;

after executing the test, based upon the set of testing information, generating an interface test metric comparing the plurality of tested interface portions to a plurality of untested interface portions, wherein the plurality of untested interface portions are not tested during the test, and wherein the interface test metric provides a measure of how thoroughly the plurality of interface portions were tested by the test;

after executing the test, based upon the set of testing information, generating an internal test metric comparing the plurality of tested internal portions to a plurality of untested internal portions, wherein the plurality of untested internal portions are not tested during the test, and wherein the internal test metric provides a measure of how thoroughly the plurality of internal portions were tested by the test; and generating an overall measure comparing the interface test metric to the internal test metric, wherein the overall measure indicates a quality of the test.

2. The method of claim 1, wherein generating the overall measure comprises determining a ratio between the interface test metric and the internal test metric.

3. The method of claim 1, wherein identifying which portion or portions within the set of code are the plurality of interface portions and which portion or portions are the plurality of internal portions comprises identifying global functions as being at least one of the plurality of interface portions and local functions as being at least one of the plurality of internal portions.

4. The method of claim 1, wherein identifying which portion or portions within the set of code are the plurality of interface portions and which portion or portions are the plurality of internal portions comprises analyzing at least one of an include file, a header file and a class library, wherein functions listed in the include file, the header file, or the class library are identified as being at least one of the plurality of interface portions.

5. The method of claim 1, wherein identifying which portion or portions within the set of code are the plurality of interface portions and which portion or portions are the plurality of internal portions comprises identifying an entrance point of a particular function as being an interface portion of the plurality of interface portions and identifying exit points, local function, logical statements, private class or protected class of the particular function as being an internal portion of the plurality of internal portions.

6. The method of claim 1, wherein identifying which portion or portions within the set of code are the plurality of interface portions and which portion or portions are the plurality of internal portions comprises analyzing a hierarchical structure that defines, for each particular function, the functions that may invoke the particular function and the functions that the particular function may invoke.

7. The method of claim 6, further comprising:
identifying a code block in the hierarchical structure;
identifying a function that may be invoked by software that is external to the code block as being an interface portion of the plurality of interface portions; and
identifying a function that may not be invoked by software that is external to the code block as being an internal portion of the plurality of internal portions.

8. The method of claim 1, wherein:
determining the interface test metric comprises determining which of the plurality of interface portions had at least one source code instruction executed by the test; and
determining the internal test metric comprises determining which of the plurality of internal portions had at least one source code instruction executed by the test.

9. The method of claim 1, wherein:
determining the interface test metric is based on how many source code instructions in the plurality of interface portions executed as a result of the test; and
determining the internal test metric is based on how many source code instructions in the plurality of internal portions executed as a result of the test.

10. The method of claim 1, wherein:
  deriving the interface test metric comprises determining how many entry points of a function are taken during the test; and
  deriving the internal test metric comprises determining how many non-interface lines of code of the function are taken during the test.

11. The method of claim 1, wherein the test is a first test, the set of testing information is a first set of testing information, the set of code is a first set of code, the plurality of interface portions are a first plurality of interface portions, the plurality of internal portions are a first plurality of internal portions, the interface test metric is a first interface test metric, the internal test metric is a first internal test metric and further comprising:
  identifying a second set of code within the first set of code, wherein the second set of code comprises a second plurality of interface portions and a second plurality of internal portions;
  for the second set of code, identifying which portion or portions are the second plurality of interface portions and which portion or portions are the second plurality of internal portions, wherein the second plurality of interface portions are portions that may be accessed by software external to the second set of code and the second plurality of internal portions are portions that may not be accessed by software external to the second set of code;
  executing a second test to test the second set of code;
  based upon a second set of testing information derived from the second test, deriving a second interface test metric that provides a measure of how thoroughly the second plurality of interface portions were tested by the second test; and
  based upon the second set of testing information, deriving a second internal test metric that provides a measure of how thoroughly the second plurality of internal portions were tested by the second test.

12. A non-transitory machine readable medium having stored thereon a set of instructions which, when executed by one or more processors, causes the one or more processors to perform a method, the method comprising:
  identifying which portion or portions within a set of code are a plurality of interface portions and which portion or portions are a plurality of internal portions, wherein the plurality of interface portions are portions that may be accessed by external software and the plurality of internal portions are portions that may be accessed by at least one of the plurality of interface portions and other of the plurality of internal portions;
  executing a test to test the set of code to obtain a set of testing information derived from the test, wherein the set of testing information identifies a plurality of tested interface portions and a plurality of tested internal portions, wherein the plurality of tested interface portions and the plurality of tested internal portions are tested during the test;
  after executing the test, based upon the set of testing information, generating an interface test metric comparing the plurality of tested interface portions to a plurality of untested interface portions, wherein the plurality of untested interface portions are not tested during the test, and wherein the interface test metric provides a measure of how thoroughly the plurality of interface portions were tested by the test;
  after executing the test, based upon the set of testing information, generating an internal test metric comparing the plurality of tested internal portions to a plurality of untested internal portions, wherein the plurality of untested internal portions are not tested during the test, and wherein the internal test metric provides a measure of how thoroughly the plurality of internal portions were tested by the test; and
  generating an overall measure comparing the interface test metric to the internal test metric, wherein the overall measure indicates a quality of the test.

13. The non-transitory machine readable medium of claim 12, wherein generating the overall measure comprises determining a ratio between the interface test metric and the internal test metric.

14. The non-transitory machine readable medium of claim 12, wherein identifying which portion or portions within the set of code are the plurality of interface portions and which portion or portions are the plurality of internal portions comprises identifying global functions as being at least one of the plurality of interface portions and local functions as being at least one of the plurality of internal portions.

15. The non-transitory machine readable medium of claim 12, wherein identifying which portion or portions within the set of code are the plurality of interface portions and which portion or portions are the plurality of internal portions comprises analyzing at least one of an include file, a header file and a class library, wherein functions listed in the include file, the header file, or the class library are identified as being at least one of the plurality interface portions.

16. The non-transitory machine readable medium of claim 12, wherein identifying which portion or portions within the set of code are the plurality of interface portions and which portion or portions are the plurality of internal portions comprises:
  identifying an entrance point of a particular function as being an interface portion of the plurality of interface portions; and
  identifying exit points, local functions, logical statements, private classes or protected classes of the particular function as being an internal portion of the plurality of internal portions.

17. The non-transitory machine readable medium of claim 12, wherein identifying which portion or portions within the set of code are the plurality of interface portions and which portion or portions are the plurality of internal portions comprises analyzing a hierarchical structure that defines, for each particular function, the functions that may invoke the particular function and the functions that the particular function may invoke.

18. The non-transitory machine readable medium of claim 17, wherein the method further comprises:
  identifying a code block in the hierarchical structure;
  identifying a function that may be invoked by software that is external to the code block as being an interface portion of the plurality of interface portions; and
  identifying a function that may not be invoked by software that is external to the code block as being an internal portion of the plurality of internal portions.

* * * * *

UNITED STATES PATENT AND TRADEMARK OFFICE
CERTIFICATE OF CORRECTION

| | | |
|---|---|---|
| PATENT NO. | : 7,904,890 B1 | Page 1 of 1 |
| APPLICATION NO. | : 11/523952 | |
| DATED | : March 8, 2011 | |
| INVENTOR(S) | : Hsieh et al. | |

It is certified that error appears in the above-identified patent and that said Letters Patent is hereby corrected as shown below:

In Claim 15, Column 12 (line 32), --of-- should be added after "plurality".

Signed and Sealed this
Third Day of May, 2011

David J. Kappos
*Director of the United States Patent and Trademark Office*